(12) United States Patent
Peuhkurinen (10) Patent No.: US 11,145,031 B2
(45) Date of Patent: Oct. 12, 2021

(54) DISPLAY APPARATUS AND METHOD OF COMPENSATING FOR VISUAL ARTIFACTS

(71) Applicant: Varjo Technologies Oy, Helsinki (FI)

(72) Inventor: Ari Antti Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/778,760

(22) Filed: Jan. 31, 2020

(65) Prior Publication Data
US 2021/0241424 A1    Aug. 5, 2021

(51) Int. Cl.
G06T 5/00 (2006.01)
G06F 3/01 (2006.01)
G09G 5/10 (2006.01)
G06T 3/00 (2006.01)

(52) U.S. Cl.
CPC ............. *G06T 5/001* (2013.01); *G06F 3/013* (2013.01); *G06T 3/00* (2013.01); *G09G 5/10* (2013.01); *G09G 2320/0261* (2013.01); *G09G 2320/0686* (2013.01); *G09G 2320/08* (2013.01)

(58) Field of Classification Search
None
See application file for complete search history.

(56) References Cited

U.S. PATENT DOCUMENTS 9,508,127 B1 * 11/2016 Katsuhara ............... G06T 5/002
9,915,822 B2    3/2018 Arndt et al.
2016/0091720 A1 * 3/2016 Stafford ............ G02B 27/0068 345/8
2017/0026592 A1    1/2017 Kuang et al.
2017/0168561 A1    6/2017 Yang
2017/0287112 A1 * 10/2017 Stafford ................. G06F 3/013
2020/0389672 A1 * 12/2020 Kennett .................... G06T 5/50

OTHER PUBLICATIONS

European Patent Office, Extended European Search Report, Application No. 21152223.0, dated Jun. 29, 2021, 10 pages.

* cited by examiner

*Primary Examiner* — Yanna Wu
(74) *Attorney, Agent, or Firm* — Ziegler IP Law Group, LLC (57) ABSTRACT

A display apparatus including first display or projector for displaying first images for first eye; second display or projector for displaying second images for second eye; first portion and second portion arranged to face first and second eyes; means for tracking poses of first and second eyes relative to first and second optical axes, respectively; and processor. Processor or external processor is configured to: obtain given pose of given eye relative to given optical axis; generate information pertaining to given visual artifact that is formed over given image at image plane when given image is displayed; determine artifact-superposing portion of given image; and process given image based on generated information and artifact-superposing portion, to generate given artifact-compensated image. Processor displays given artifact-compensated image via given display or projector.

16 Claims, 3 Drawing Sheets

DISPLAY APPARATUS AND METHOD OF COMPENSATING FOR VISUAL ARTIFACTS

TECHNICAL FIELD

The present disclosure relates generally to display apparatuses; and more specifically, to display apparatuses that compensate for visual artifacts. Moreover, the present disclosure also relates to methods of compensating for visual artifacts in the aforementioned display apparatuses.

BACKGROUND

Presently, several technologies (for example, such as virtual reality (VR), augmented reality (AR), mixed reality (MR) and the like) are being used to present interactive extended-reality environments to users. Typically, the users utilize specialized devices (for example, such as a virtual reality device, an augmented reality device, a mixed reality device, and the like) for experiencing and interacting with such extended-reality environments. In use, the user generally wears (namely, supports) the specialized device on his/her head.

Conventional specialized devices employ various equipment in order to present to the user, images that constitute the extended-reality environment. Examples of such equipment include displays, processors, optical components (for example, such as lenses and mirrors), and the like. As an example, two offset images of a given scene may be generated by a processor and displayed at separate displays for both eyes of the user. Then, light emanating from the displayed offset images may be directed by multiple optical components to eventually reach the user's eyes for presenting to the user a stereoscopic view of the given scene.

However, the conventional specialized devices have certain limitations. As an example, the optical elements in these specialized devices often cause production of unwanted artifacts that are visible to the user. These artifacts are produced, for example, as a result of specular reflection and diffuse reflection of light emanating from displayed images. Specular reflection of the light from the optical elements may cause appearance of artifacts. Diffuse reflection of the light from internal surfaces of the display apparatus may also cause appearance of artifacts. The artifacts appear as ghost reflections, light spots, and the like, and considerably spoil the user's experience of viewing the extended-reality environments.

Therefore, in light of the foregoing discussion, there exists a need to overcome the aforementioned drawbacks associated with presence of artifacts in conventional specialized devices that present interactive extended-reality environments.

SUMMARY

The present disclosure seeks to provide a display apparatus. The present disclosure also seeks to provide a method of compensating for visual artifacts in a display apparatus. The present disclosure seeks to provide a solution to the existing problem of visible artifacts that are produced within conventional specialized devices. An aim of the present disclosure is to provide a solution that overcomes at least partially the problems encountered in prior art, and provides a display apparatus that displays artifact-compensated images that, when displayed, suppress the appearance of visual artifacts in a manner that the user is unable to perceive the visual artifacts.

In one aspect, an embodiment of the present disclosure provides a display apparatus comprising:

at least one first display or projector that, in operation, displays first images to be presented to a first eye of a user;

at least one second display or projector that, in operation, displays second images to be presented to a second eye of the user;

a first portion and a second portion that are arranged to face the first eye and the second eye, respectively, the first portion and the second portion having a first optical axis and a second optical axis, respectively;

means for tracking a pose of the first eye and a pose of the second eye relative to the first optical axis and the second optical axis, respectively; and a processor coupled to the at least one first display or projector, the at least one second display or projector and said means, wherein the processor or at least one external processor communicably coupled to the processor is configured to:

obtain a given pose of a given eye relative to a given optical axis of a given portion of the display apparatus;

generate, based on the given pose of the given eye and a given image to be presented to the given eye, information pertaining to a given visual artifact that is formed over the given image at an image plane when the given image is displayed at a given display or projector;

determine, based on the given pose of the given eye, an artifact-superposing portion of the given image on which the given visual artifact superimposes at the image plane when the given image is displayed at the given display or projector; and process the given image based on the generated information and the determined artifact-superposing portion, to generate a given artifact-compensated image, wherein the processor is configured to display the given artifact-compensated image via the given display or projector.

In another aspect, an embodiment of the present disclosure provides a method of compensating for visual artifacts in a display apparatus, the method comprising:

obtaining a given pose of a given eye of a user relative to a given optical axis of a given portion of the display apparatus;

generating, based on the given pose of the given eye and a given image to be presented to the given eye, information pertaining to a given visual artifact that is formed over the given image at an image plane when the given image is displayed at a given display or projector of the display apparatus;

determining, based on the given pose of the given eye, an artifact-superposing portion of the given image on which the given visual artifact superimposes at the image plane when the given image is displayed at the given display or projector;

processing the given image based on the generated information and the determined artifact-superposing portion, to generate a given artifact-compensated image; and displaying the given artifact-compensated image via the given display or projector.

Embodiments of the present disclosure substantially eliminate or at least partially address the aforementioned problems in the prior art, and enable suppression of appearance of visual artifacts in the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
at least one first display or projector that, in operation, displays first images to be presented to a first eye of a user;
at least one second display or projector that, in operation, displays second images to be presented to a second eye of the user;
a first portion and a second portion that are arranged to face the first eye and the second eye, respectively, the first portion and the second portion having a first optical axis and a second optical axis, respectively;
means for tracking a pose of the first eye and a pose of the second eye relative to the first optical axis and the second optical axis, respectively; and
a processor coupled to the at least one first display or projector, the at least one second display or projector and said means, wherein the processor or at least one external processor communicably coupled to the processor is configured to:
obtain a given pose of a given eye relative to a given optical axis of a given portion of the display apparatus;
generate, based on the given pose of the given eye and a given image to be presented to the given eye, information pertaining to a given visual artifact that is formed over the given image at an image plane when the given image is displayed at a given display or projector;
determine, based on the given pose of the given eye, an artifact-superposing portion of the given image on which the given visual artifact superimposes at the image plane when the given image is displayed at the given display or projector; and
process the given image based on the generated information and the determined artifact-superposing portion, to generate a given artifact-compensated image,
wherein the processor is configured to display the given artifact-compensated image via the given display or projector.

In another aspect, an embodiment of the present disclosure provides a method of compensating for visual artifacts in a display apparatus, the method comprising:
obtaining a given pose of a given eye of a user relative to a given optical axis of a given portion of the display apparatus;
generating, based on the given pose of the given eye and a given image to be presented to the given eye, information pertaining to a given visual artifact that is formed over the given image at an image plane when the given image is displayed at a given display or projector of the display apparatus;
determining, based on the given pose of the given eye, an artifact-superposing portion of the given image on which the given visual artifact superimposes at the image plane when the given image is displayed at the given display or projector;
processing the given image based on the generated information and the determined artifact-superposing portion, to generate a given artifact-compensated image; and
displaying the given artifact-compensated image via the given display or projector.

The present disclosure provides the aforementioned display apparatus and the aforementioned method of compensating for visual artifacts in a display apparatus. In the display apparatus, digital artifact compensation is performed based on the given pose of the given eye and the given image to be presented to the given eye. In particular, the given image is processed to generate the given artifact-compensated image. When the given artifact-compensated image is displayed, visual artifact(s) are still formed over the artifact-compensated image at the image place, but are now imperceptible to the user. Beneficially, the manner of digital artifact compensation described herein effectively suppresses appearance of formed visual artifact(s) to such an extent that the user is unable to perceive the formed visual artifacts when using the display apparatus. The described manner of digital artifact compensation allows for considerably reducing or eliminating appearance of the visual artifacts.

Throughout the present disclosure, the term "display apparatus" refers to specialized equipment that is configured to present an extended-reality environment to the user when the display apparatus in operation is worn by the user on his/her head. In such an instance, the display apparatus acts as a device (for example, such as an extended-reality headset, a pair of extended-reality glasses, and the like) that is operable to present a visual scene of the extended-reality environment to the user. The display apparatus may also commonly be referred to as "head-mounted display apparatus".

It will be appreciated that the term "extended-reality" encompasses virtual reality, augmented reality, mixed reality, and the like.

Throughout the present disclosure, the term "display" refers to equipment that, in operation, displays a given image that is to be shown to a given eye of the user, whereas the term "projector" refers to equipment that, in operation, projects a given image that is to be shown to a given eye of the user. Optionally, a given projector projects the given image onto a projection screen or directly onto a retina of the given eye of the user. Herein, the terms "first display or projector" and "second display or projector" are used merely to distinguish between different displays or projectors that are used for displaying different images for different eyes of the user.

Optionally, the at least one first display and/or the at least one second display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one first projector and/or the at least one second projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

In one embodiment, the first images and second images are virtual-reality images. The virtual-reality images, when displayed, present a visual scene of a virtual reality environment to the user. In another embodiment, the first images and second images are augmented-reality images. The augmented-reality images, when displayed, present a visual scene of an augmented reality environment to the user. In yet another embodiment, the first images and second images are mixed-reality images. The mixed-reality images, when displayed, present a visual scene of a mixed reality environment to the user.

Throughout the present disclosure, the terms "first portion" and "second portion" refer to different portions of a body of the display apparatus. When the display apparatus in operation is worn by the user, the first portion and the second portion are arranged to face the first eye and the second eye, respectively. Notably, the first portion and the second portion act as different chambers of the display apparatus that house optical components, electrical components and/or mechanical components (of the display apparatus) corresponding to the first eye and the second eye, respectively. As an example, the first portion may house at least the at least one first display or projector, whereas the second portion may house at least the at least one second display or projector.

Throughout the present disclosure, the terms "first optical axis" and "second optical axis" refer to optical axes of optics corresponding to the first eye and the second eye, respectively. Notably, the first optical axis corresponds to the first portion, whereas the second optical axis corresponds to the second portion.

Throughout the present disclosure, the term "means for tracking the pose of the first eye and the pose of the second eye" refers to specialized equipment for detecting and/or following poses of the first and second eyes of the user relative to the first and second optical axes, respectively. Notably, said means for tracking generates eye-tracking data indicative of poses of the user's eyes relative to the first and second optical axes. In other words, the eye-tracking data is indicative of pose of the user's eyes relative to their corresponding optics of the display apparatus. Herein, the term "pose" encompasses both position and orientation.

In some implementations, the poses of the first and second eyes are tracked separately, whereas, in other implementations, the poses of the first and second eyes are tracked together.

Optionally, a pose of a given eye relative to a given optical axis is determined as distance of a center of a pupil of the given eye and/or a center of the given eye from the given optical axis, when a gaze direction the given eye is straight. Optionally, in this regard, a distance of the center of the pupil of the given eye and/or the center of the given eye from a given spot on the given optical axis is determined using at least one mathematical formula. The at least one mathematical formula pertains to two-dimensional coordinate geometry or three-dimensional coordinate geometry. Optionally, an angular separation between an orientation of the given eye and the given optical axis is determined using at least one of: quaternions, Euler angles, a mathematical formula pertaining to two-dimensional coordinate geometry or three-dimensional coordinate geometry.

According to an embodiment, the means for tracking the pose of the first eye and the pose of the second eye is an eye-attached tracking solution. In such a case, said means is implemented as contact lenses with embedded mirrors or sensors.

According to another embodiment, the means for tracking the pose of the first eye and the pose of the second eye is an optical tracking solution. Optionally, in such a case, said means is implemented as: a first illuminator and a second illuminator for emitting light towards the first eye and the second eye, respectively; a first camera for capturing at least one image of the first eye, the first camera being arranged on the first optical axis; and a second camera for capturing at least one image of the second eye, the second camera being arranged on the second optical axis. In such a case, the captured at least one image of the first eye depicts reflections of the emitted light from the first eye, whereas the captured at least one image of the second eye depicts reflections of the emitted light from the second eye. These reflections are commonly referred to as "glints". The emitted light could be infrared light or visible light. In such a case, visual features of the first and second eyes (depicted in images thereof) are used to determine the poses of the first and second eyes relative to the first and second optical axes. Examples of such visual features include, but are not limited to, shapes of pupils, sizes of pupils, positions of pupils with respect to reflections of glints, shapes of irises, sizes of irises, and positions of eye corners.

According to yet another embodiment, the means for tracking the pose of the first eye and the pose of the second eye is a display or projector-based tracking solution. In such a case, said means is implemented as the at least one first display or projector, the at least one second display or projector, a first camera corresponding to the first eye, and a second camera corresponding to the second eye. In operation, the at least one first display or projector and the at least one second display or projector display a dot in a center of a field of view of the first eye and a center of a field of view of the second eye, respectively, and the first camera and the second camera capture images of their corresponding eyes while the user gazes towards the dots. Said captured images are analyzed to determine the poses of the first eye and the second eye relative to the first optical axis and the second optical axis, respectively.

According to still another embodiment, the means for tracking the pose of the first eye and the pose of the second eye is an electric potential measurement-based solution. In such a case, said means is implemented as electrodes placed around the first and second eyes, wherein said electrodes measure electric potentials indicative of the poses of the first and second eyes.

It will be appreciated that several means for tracking the pose of the first eye and the pose of the second eye are well-known in the art.

Optionally, the eye-tracking data comprises one of: contact lens sensor data, images of the first and second eyes depicting reflections of the emitted light and the visual features of the first and second eyes, images of the first and second eyes that are captured while the user gazes towards the dots displayed in the centers of fields of view of the first and second eyes, the electric potentials measured via the electrodes. These different types of eye-tracking data correspond to the aforesaid different implementations of the means for tracking the pose of the first eye and the pose of the second eye.

Throughout the present disclosure, the term "processor" refers to hardware, software, firmware or a combination of these. The processor controls overall operation of the display apparatus. In particular, the processor is coupled to and controls operation of the at least one first display or projector, the at least one second display or projector and said means. It will be appreciated that the processor is coupled to various components of the display apparatus and optionally, controls operation of at least some of said components.

Optionally, the processor is implemented as a controller that is configured to control a compositor to perform artifact-compensation operations.

Throughout the present disclosure, the term "external processor" refers to a processor that is implemented as a processor of an external computing device. In such a case, the external computing device is communicably coupled to the display apparatus as the at least one external processor is communicably coupled to the processor. The at least one external processor is communicably coupled to the processor wirelessly and/or in a wired manner. It will be appreciated that performing, at the at least one external processor, at least some computational tasks associated with artifact compensation is beneficial, as it would considerably reduce processing burden on the processor of the display apparatus. Typically, the computational tasks associated with artifact compensation are computationally expensive.

Optionally, the steps of calculating and storing pre-calculated reflection models (described later) and/or algorithms are performed by a first external processor, while the steps of accessing the pre-calculated reflection models and/or algorithms may be performed by a second external processor.

Optionally, the at least one external processor executes at least one software application that controls an operational behavior of the display apparatus. Optionally, in this regard, the at least one software application generates the first images and the second images.

The processor or the at least one external processor obtain a given pose of a given eye relative to a given optical axis of a given portion of the display apparatus. Optionally, the processor or the at least one external processor directly obtain the given pose of the given eye from the means for tracking the pose of the first eye and the pose of the second eye. Alternatively, optionally, the processor or the at least one external processor obtain the eye-tracking data from the means for tracking the pose of the first eye and the pose of the second eye, and process the eye-tracking data to determine the given pose of the given eye. Notably, different types of eye-tracking data are processed differently (based on their type) to determine the given pose of the given eye.

It will be appreciated that the poses of the first and second eyes are obtained repeatedly for the display apparatus as the poses of the user's eyes relative to the first and second optical axes keeps changing whilst he/she uses the display apparatus. An up-to-date information indicative of current poses of the user's eyes allows for presenting an up-to-date artifact-compensated extended-reality environment to the user of the display apparatus.

In an embodiment, when obtaining the given pose of the given eye, the processor or the at least one external processor is configured to process the eye-tracking data obtained from said means to determine the given pose of the given eye relative to the given optical axis of the given portion of the display apparatus. In this regard, instantaneous eye-tracking data is obtained from said means and is processed to determine the given pose of the given eye. In other words, instantaneous eye-tracking is optionally used for artifact compensation in the display apparatus.

As an example, the eye-tracking data may comprise the images of the first and second eyes depicting reflections of the emitted light and the visual features of the first and second eyes. In one example scenario, these images may be processed to determine that the shapes of the pupils of said eyes are circular, and that optical axes of the first and second eyes are oriented along the first and second optical axes, respectively. In another example scenario, these images may be processed to determine that the shapes of the pupils of said eyes are elliptical, and that optical axes of the first and second eyes are not oriented along the first and second optical axes, respectively. Moreover, a degree of ovalness of these elliptically-shaped pupils is indicative of orientations of the first and second eyes (specifically, of an angle between the optical axes of the first and second eyes and the first and second optical axes, respectively). Furthermore, sizes of irises of said eyes are indicative of positions of the first and second eyes (specifically, of distances of the first and second eyes from the first and second portions, respectively). In this way, instantaneous eye-tracking data may be processed to determine instantaneous poses of the first and second eyes.

In another embodiment, when obtaining the given pose of the given eye, the processor or the at least one external processor is configured to:

process the eye-tracking data obtained from said means to determine a plurality of poses of the given eye relative to the given optical axis of the given portion of the display apparatus; and determine the given pose of the given eye by calculating a mean or median of the plurality of poses of the given eye.

In this regard, historically obtained eye-tracking data (that is indicative of historically determined poses of the given eye) is used to determine the given pose of the given eye. The given pose of the given eye corresponds to the mean or median of the plurality of poses of the given eye. Therefore, historical eye-tracking is optionally used for artifact compensation in the display apparatus.

In yet another embodiment, when obtaining the given pose of the given eye, the processor or the at least one external processor is configured to:

process the eye-tracking data obtained from said means to determine a plurality of poses of the given eye relative to the given optical axis of the given portion of the display apparatus;

calculating a probability distribution of the plurality of poses of the given eye; and selecting, from amongst the plurality of poses, a pose having a highest probability in the probability distribution as the given pose of the given eye.

In this regard, historically obtained eye-tracking data (that is indicative of historically determined poses of the given eye) is used to determine the given pose of the given eye. Optionally, the probability distribution is indicative of probabilities of occurrence of each pose among the plurality of poses, said probabilities being calculated based on frequency of occurrence of each pose in the eye-tracking data. The given pose of the given eye is selected, by default, as the pose having the highest probability of occurrence amongst the plurality of poses of the given eye. Therefore, historical eye-tracking is optionally used for artifact compensation in the display apparatus.

Throughout the present disclosure, the term "visual artifact" refers to a visual anomaly that is apparent during provision of the extended-reality environment within the display apparatus. A given visual artifact is formed as a result of displaying a given image at a given display or projector, since light emanating from the displayed given image undergoes reflections (thereby, causing formation of the given visual artifact) while traveling through the display apparatus. Visual artifacts may be formed due to specular reflections or diffuse reflections of the light from components (for example, such as optical components, mechanical components, electronic components, and the like) within the first and second portions and/or from surfaces of the first and second portions.

Throughout the present disclosure, the term "image plane" refers to an imaginary plane on which a required image is produced upon being displayed at its corresponding display or projector. The required image is visible to the user.

When a given image (to be presented to a given eye) would be displayed at its corresponding display or projector, a given visual artifact would be formed over the given image at the image plane. Information pertaining to the given visual artifact is generated based on the given pose of the given eye and the given image. As the given pose of the given eye and the given image keeps changing while the display apparatus is in operation, the information pertaining to the given visual artifact would also keep changing correspondingly. It will be appreciated that firstly, the poses of different eyes of the user may be different, and would therefore require different artifact compensations to be applied to their corresponding images. Moreover, different users have different interpupillary distances, due to which one eye may be misaligned to a greater extent than the other eye. Secondly, different images to be presented to the given eye would also require different artifact compensations. This is due to the fact that content of different images would be different, wherein the content of a given image is defined by intensities of individual pixels of the given image. Therefore, the information pertaining to the given visual artifact is generated based on both the given pose of the given eye and the given image.

Optionally, the information pertaining to the given visual artifact comprises at least one of: a position of the given visual artifact, a shape of the given visual artifact, a size of the given visual artifact, a brightness of the given visual artifact, colors in the given visual artifact.

Optionally, the position of the given visual artifact, the shape of the given visual artifact, and the size of the given visual artifact are generated based on the given pose of the given eye. When the given pose of the given eye changes, a perspective from which the given eye views the given visual artifact formed on the image plane also changes. Therefore, the position, the shape, and the size of the given visual artifact can be determined according to the given pose of the given eye.

Optionally, the brightness of the given visual artifact and the colors in the given visual artifact are generated based on the given image. More optionally, the brightness of the given visual artifact and the colors in the given visual artifact are generated based on the intensities of individual pixels of the given image. Herein, the term "intensity" of a given pixel refers to a resultant pixel value of the given pixel, wherein the resultant pixel value of the given pixel is an additive total of pixel values of all constituent color channels of the given pixel. The intensity of the given pixel is indicative of a brightness of the given pixel and a color of the given pixel, which in turn, is indicative of the brightness and the color of the given visual artifact. As an example, pixel values of a red color channel, a blue color channel and a green color channel associated with the given pixel may be '64', '224' and '208', respectively. In such an example, the pixel value (namely, the intensity) of the given pixel may be '496', and the given pixel would have a 'turquoise' color and 65.9 percent brightness (according to a scale where black color has 0 percent brightness and white color has 100 percent brightness).

The information pertaining to the given visual artifact may be generated on-the-fly (for example, in implementations where instantaneous eye-tracking data is used to determine the given pose of the given eye) or may be pre-calculated (for example, in implementations where historically obtained eye-tracking data is used to determine the given pose of the given eye).

When the given image would be displayed at the given display or projector, light (namely, a projection of the given image) would emanate from the given display or projector and would travel through the given portion of the display apparatus to be incident on the image plane. The given visual artifact would be formed on (namely, superimposed on) the artifact-superposing portion of the given image as a result of the reflections undergone by the light while traveling through the given portion. Herein, the "artifact-superposing portion" of the given image refers to a portion of the given image upon which the given visual artifact is formed. Notably, a position of the artifact-superposing portion within the given image would depend on the given pose of the given eye, as the given pose of the given eye corresponds to a given perspective from which the given eye views the image plane. In other words, a change in the pose (specifically, a change in position and/or orientation) of the given eye would result in a change in the position of this artifact-superposing portion. The change in the position of the given eye could be: (i) sideways with respect to the given optical axis, (ii) closer towards the display apparatus, or (iii) farther away from the display apparatus. The change in the orientation of the given eye could be tilting of the given eye with respect to the given optical axis. Notably, the change in the pose of the given eye also affects the shape and the size of the given visual artifact, and correspondingly, a shape and a size of the artifact-superposing portion of the given image.

It will be appreciated that the position of the artifact-superposing portion within the given image also depend on several factors including, but not limited to, an arrangement of components in the given portion (of the display apparatus) corresponding to the given eye), optical characteristics of the components in the given portion, physical characteristics of the components in the given portion.

The given image is processed based on the generated information and the determined artifact-superposing portion to generate a given artifact-compensated image. Throughout the present disclosure, the term "artifact-compensated image" refers to an image that, when rendered, eliminates or minimizes appearance of unwanted visual artifacts. Notably, intensities of pixels within the artifact-superposing portion of the given image are digitally adjusted to generate the given artifact-compensated image. This adjustment compensates for subsequent formation of the given visual artifact on the given artifact-compensated image which would occur when the given artifact-compensated image is displayed via the given display or projector.

Optionally, when generating the given artifact-compensated image, the processor or the at least one external processor is configured to employ at least one image processing operation to smoothen an edge of the artifact-superposing portion of the given image and/or to adjust an intensity of pixels surrounding the artifact-superposing portion of the given image.

The processor is configured to display the given artifact-compensated image via the given display or projector. When the given artifact-compensated image is displayed, a projection of the given artifact-compensated image emanates from the given display or projector and is incident on the image plane. The given visual artifact is formed on an artifact-superposing portion of the given artifact-compensated image that corresponds to the artifact-superposing portion of the given image. When the given visual artifact is formed, the given visual artifact and intensities of pixels within the artifact-superposing portion of the given artifact-compensated image are additively blended in a manner that the given visual artifact is imperceptible to the user. The given artifact-compensated image is visible to the user.

It will be appreciated that the given visual artifact is not necessarily presented to the given eye of the user. In some implementations, the given image is never displayed. In other words, only the given artifact-compensated image is displayed. In such implementations, the given visual artifact is a visual artifact that would be formed over the given image at the image plane if the given image were displayed at the given display or projector. In other implementations, the given image is displayed once and then it is artifact-compensated during rendering to generate at least one additional image frames (namely, artifact-compensated images). Typically, a frame rate of the display apparatus is quite high (for example, such as 100 frames per second), so a time duration for which the user views a given frame is quite short (for example, such as 0.01 seconds). In such a case, optionally displaying the given image as one image frame and the artifact-compensated images as remaining image frames would not harm user experience.

Optionally, the information pertaining to the given visual artifact comprises an artifact image that is representative of the given visual artifact. Herein, the term "artifact image" refers to an image that represents visual characteristics of the given visual artifact. These visual characteristics include, but are not limited to, the shape of the given visual artifact, the size of the given visual artifact, the brightness of the given visual artifact, and the colors in the given visual artifact.

Optionally, when processing the given image, the processor or the at least one external processor is configured to adjust, based on an intensity of individual pixels within the artifact image, an intensity of corresponding pixels within the artifact-superposing portion of the given image. Optionally, in this regard, the intensity of pixels within the artifact-superposing portion of the given image is reduced by an amount equal to an intensity of corresponding pixels within the artifact image. When the artifact image is superimposed on the artifact-superposing portion of the given image, the intensities of pixels within the artifact image and the adjusted intensities of the corresponding pixels within the artifact-superposing portion of the given image are additively combined to achieve a resultant pixel intensity. This resultant pixel intensity corresponds to an original intensity of the pixels (notably, an intensity of the pixels prior to the aforesaid adjustment) within the artifact-superposing portion of the given image. As a result, the user is unable to perceive the given visual artifact.

Optionally, the display apparatus further comprises means for tracking a gaze direction of the first eye and a gaze direction of the second eye, said means being coupled to the processor, wherein the processor or the at least one external processor is configured to obtain a given gaze direction of the given eye and to determine, based on the given gaze direction of the given eye, a region of interest within the given image, wherein, when processing the given image, the processor or the at least one external processor is configured to:

detect whether or not the artifact-superposing portion of the given image overlaps with the region of interest within the given image; and adjust the intensity of the pixels within the artifact-superposing portion when it is detected that the artifact-superposing portion of the given image overlaps with the region of interest within the given image.

Throughout the present disclosure, the term "means for tracking the gaze direction of the first eye and the gaze direction of the second eye" refers to specialized equipment for detecting and/or following directions of gaze of the user's eyes. Notably, the gaze directions of the user's eyes are detected when the display apparatus in operation is worn by the user. For sake of simplicity, the "means for tracking the gaze direction of the first eye and the gaze direction of the second eye" has been referred to as "means for tracking the gaze directions" hereinbelow. Optionally, the means for tracking the gaze directions is implemented by way of contact lenses with sensors, cameras monitoring a position of a pupil of the user's eye, and the like. Such means for tracking the gaze directions are well-known in the art. Beneficially, the means for tracking the gaze directions is arranged in a manner that said means does not cause any obstruction in an optical path of a projection of the given artifact-compensated image (that is to be shown to the given eye of the user). It is to be understood that the means for tracking the gaze directions may also be referred to as an "eye-tracker system", a "gaze-tracking system" or a "means for detecting the gaze directions".

It will be appreciated that the means for tracking the gaze directions is optionally employed to track the gaze directions of the first and second eyes repeatedly over a period of time, when the display apparatus in operation is worn by the user. The processor or the at least one external processor obtain, from said means, a current gaze direction of the given eye, and map the current gaze direction to a region within the given image, thereby determining said region as a current region of interest within the given image.

The "region of interest" within the given image refers to a region within the given image towards which the gaze directions of the user's eyes would be oriented when the given image is displayed via the given display or projector.

Optionally, the artifact-superposing portion of the given image is detected to overlap with the region of interest within the given image when at least 20 percent pixels (and more optionally, at least 35 percent pixels, and yet more optionally, at least 50 percent pixels) of the artifact-superposing portion overlap with pixels of the region of interest.

Optionally, when it is detected that the artifact-superposing portion of the given image overlaps with the region of interest within the given image, the intensity of the pixels within the artifact-superposing portion is reduced by the amount equal to an intensity of corresponding pixels within the artifact image. In such a case, without said intensity adjustment, the gaze directions of the first and second eyes would be directed towards the given visual artifact, and the given visual artifact would be clearly visible to the user. Since visibility of the given visual artifact to the user is undesirable, the intensity of the pixels within the artifact-superposing portion is adjusted (notably, reduced) in a manner that upon superimposition of the artifact image upon the artifact-superposing portion, the resultant pixel intensity corresponds to the original intensity of the pixels within the artifact-superposing portion. As a result, even when the given visual artifact is formed over the region of interest towards which the user is gazing, the user is unable to perceive the given visual artifact.

Optionally, when generating the information pertaining to the given visual artifact, the processor or the at least one external processor is configured to:

determine, based on the given pose of the given eye, a deforming transformation to be applied to the given image; and apply the deforming transformation to the given image to generate the artifact image.

Throughout the present disclosure, the term "deforming transformation" refers to an image processing operation pertaining to deformation. Said deformation pertains to artifact compensation. Since different eyes of the user have different poses, the given visual artifact would appear differently to the different eyes. As a result, different deforming transformations are required to be applied for the different eyes, to generate different artifact images for the different eyes. The deforming transformation, when applied, deforms the given image to generate the artifact image in a manner that the artifact image corresponds to the shape of the given visual artifact and the size of the given visual artifact.

Optionally, the deforming transformation comprises at least one of: image cropping, image trimming, image reorienting, image skewing, image perspective warping.

In an embodiment, when generating the information pertaining to the given visual artifact, the processor or the at least one external processor is configured to bin pixels of the given image prior to applying the deforming transformation, wherein a resolution of the artifact image is lower than a resolution of the given image.

It will be appreciated that the given visual artifact would typically appear as a soft visual anomaly over the given image, when the given image is displayed. Therefore, the pixels of the given image are binned prior to applying the deforming transformation, so that the given visual artifact (depicted in the artifact image) would appear to be blurred in comparison to the given image. This binning operation is performed prior to application of the deforming transformation as said binning operation requires intensity information of a large number of pixels in the given image, and this intensity information would be lost if some of these pixels are expunged by the application of the deforming transformation.

Herein, "binning" refers to an image processing operation wherein intensities of a group of neighbouring pixels are combined (for example, averaged) to yield a single resultant intensity, the single resultant intensity being associated with a single super-pixel corresponding to the group of neighbouring pixels. The artifact image includes a plurality of such super-pixels that are generated upon implementing the binning operation on pixels of the given image. Herein, the term "super pixel" has been used to establish a difference in size between the pixels of the artifact image and the pixels of the given image. Notably, the pixels of the artifact image are much larger than the pixels of the given image. As a result of the binning operation, the resolution of the artifact image is lower than the resolution of the given image.

Optionally, the intensities of the pixels in the given image are binned in groups of four (namely, quad-groups). As an example, intensities of 4 pixels that are arranged as a 2*2 grid in a given region of the given image may be averaged to yield a resultant intensity, the resultant intensity being associated with a super-pixel (corresponding to the grid of 4 pixels) in the artifact image. In simpler words, the 4 pixels in the given image become one pixel in the artifact image. In this example, the resolution of the artifact image would be one-fourth the resolution of the given image.

In another embodiment, when generating the information pertaining to the given visual artifact, the at least one processor optionally employs other image processing operations for reducing the resolution of the given image to generate the artifact image. These other image processing operations could be applied to the given image prior to or after applying the deforming transformation. Examples of such other image processing operations include, but are not limited to, low-pass filtering, image subsampling, and applying a blur filter (for example, such as a Gaussian blur filter).

Optionally, when generating the information pertaining to the given visual artifact, the processor or the at least one external processor is configured to determine an artifact-causing portion of the given image that causes formation of the given visual artifact, wherein the deforming transformation is to be applied to the artifact-causing portion of the given image. It will be appreciated that the given visual artifact is generally formed only due to the artifact-causing portion of the given image, and not due to an entirety of the given image. Therefore, the deforming transformation is optionally applied only to the artifact-causing portion of the given image, to generate the artifact image.

Optionally, the artifact-causing portion of the given image that causes formation of the given visual artifact is determined by retracing an optical path traversed by light causing the given visual artifact. The light causing the given visual artifact emanates from the artifact-causing portion of the given image and travels along the optical path to be incident upon the image plane. Upon retracing this optical path (from the image plane to the given display or projector that displays the given image) of the light causing the given visual artifact, the artifact-causing portion of the given image is determined.

Optionally, the processor or the at least one external processor is configured to adjust, an intensity of individual pixels within the artifact-causing portion of the given image.

More optionally, the processor or the at least one external processor is configured to reduce the intensity of individual pixels within the artifact-causing portion of the given image. When the intensity of pixels within the artifact-causing portion of the given image is reduced, the formation of the given visual artifact is suppressed.

Optionally, the processor or the at least one external processor is configured to:

generate, based on the given pose of the given eye and the given image, information pertaining to at least one other visual artifact that is formed outside a periphery of the given image at the image plane when the given image is displayed at the given display or projector;

determine at least one other artifact-causing portion of the given image that causes formation of the at least one other visual artifact; and adjust, based on the information pertaining to the at least one other visual artifact, an intensity of individual pixels within the at least one other artifact-causing portion of the given image.

It will be appreciated that an outer boundary of a viewport of the display apparatus lies in the periphery of the given image. Therefore, the at least one other visual artifact is formed between the periphery of the given image and the outer boundary of the viewport. Herein, the term "viewport" refers to a viewing region of the display apparatus.

Optionally, the intensity of individual pixels within the at least one other artifact-causing portion of the given image is reduced, based on the information pertaining to the at least one other visual artifact. Upon reduction in the intensity (namely, dimming) of individual pixels within the at least one other artifact-causing portion of the given image, the formation of the given visual artifact is suppressed.

Optionally, the processor or the at least one external processor is configured to generate a reflection model comprising, for the plurality of poses of the given eye, reference information pertaining to visual artifacts that are formed over a given reference image at the image plane. This reflection model can be easily accessed and used whilst performing artifact-compensation in the display apparatus.

In an embodiment, the reference information is obtained via measurement. In this regard, the processor or the at least one external processor are configured to:

display the given reference image at the given display or projector;

adjust, via at least one actuator, a pose of at least one camera to correspond to a plurality of test poses to enable the at least one camera to capture a plurality of test images, wherein the plurality of test poses correspond to the plurality of poses of the given eye and the plurality of test images represent the visual artifacts that are formed for the plurality of poses of the given eye; and process the plurality of test images to determine, for each pose amongst the plurality of poses, corresponding reference information pertaining to at least one visual artifact that is formed over the given reference image at the image plane. It will be appreciated that said reference information depends on manufacturing tolerances of the display apparatus, and therefore, is display apparatus model-specific. Moreover, the actuator(s) and camera(s) used are well-known in the art.

In another embodiment, the reference information is obtained via optical characteristic modelling. In this regard, the processor or the at least one external processor are configured to:

display the given reference image at the given display or projector; and digitally simulate operation of the display apparatus to obtain the reference information using given technical specifications of the components of the display apparatus, geometry of the optics of the display apparatus, and optical characteristics of the optics, Optionally, the processor or the at least one external processor is configured to use the reflection model to infer a mathematical function for predicting the information pertaining to the given visual artifact that is formed over the given image. Alternatively, optionally, the processor or the at least one external processor is configured to define a custom mathematical function for predicting the information pertaining to the given visual artifact that is formed over the given image.

The present disclosure also relates to the method as described above. Various embodiments and variants disclosed above apply mutatis mutandis to the method.

Optionally, in the method, the step of obtaining the given pose of the given eye comprises processing eye-tracking data to determine the given pose of the given eye relative to the given optical axis of the given portion of the display apparatus.

Alternatively, optionally, in the method, the step of obtaining the given pose of the given eye comprises:

processing eye-tracking data to determine a plurality of poses of the given eye relative to the given optical axis of the given portion of the display apparatus; and determining the given pose of the given eye by calculating a mean or median of the plurality of poses of the given eye.

Optionally, in the method, the information pertaining to the given visual artifact comprises an artifact image that is representative of the given visual artifact.

Optionally, in the method, the step of processing the given image comprises adjusting, based on an intensity of individual pixels within the artifact image, an intensity of corresponding pixels within the artifact-superposing portion of the given image.

Optionally, the method further comprises:

obtaining a given gaze direction of the given eye; and determining, based on the given gaze direction of the given eye, a region of interest within the given image, wherein the step of processing the given image comprises:

detecting whether or not the artifact-superposing portion of the given image overlaps with the region of interest within the given image; and adjusting the intensity of the pixels within the artifact-superposing portion when it is detected that the artifact-superposing portion of the given image overlaps with the region of interest within the given image.

Optionally, in the method, the step of generating the information pertaining to the given visual artifact comprises:

determining, based on the given pose of the given eye, a deforming transformation to be applied to the given image; and applying the deforming transformation to the given image to generate the artifact image.

Optionally, in the method, the step of generating the information pertaining to the given visual artifact comprises binning pixels of the given image prior to applying the deforming transformation, wherein a resolution of the artifact image is lower than a resolution of the given image.

Optionally, in the method, the step of generating the information pertaining to the given visual artifact comprises:

determining an artifact-causing portion of the given image that causes formation of the given visual artifact; and applying the deforming transformation to the artifact-causing portion of the given image.

Optionally, the method further comprises:

generating, based on the given pose of the given eye and the given image, information pertaining to at least one other visual artifact that is formed outside a periphery of the given image at the image plane when the given image is displayed at the given display or projector;

determining at least one other artifact-causing portion of the given image that causes formation of the at least one other visual artifact; and adjusting, based on the information pertaining to the at least one other visual artifact, an intensity of individual pixels within the at least one other artifact-causing portion of the given image.

DETAILED DESCRIPTION OF THE DRAWINGS

Figure 1:
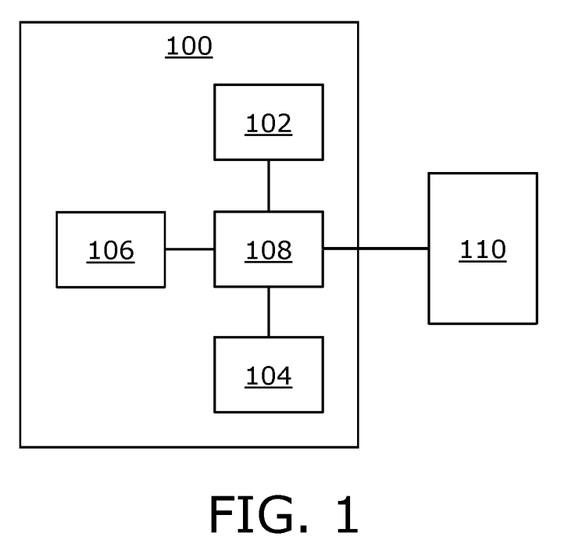
FIGS. 1 and 2 illustrate block diagrams of architectures of a display apparatus, in accordance with different embodiments of the present disclosure.

Referring to FIG. 1, illustrated is a block diagram of an architecture of a display apparatus 100, in accordance with an embodiment of the present disclosure. The display apparatus 100 comprises at least one first display or projector (depicted as a first display or projector 102), at least one second display or projector (depicted as a second display or projector 104), a first portion (not shown) and a second portion (not shown), a means 106 for tracking a pose of a first eye and a pose of a second eye, and a processor 108. The processor 108 is coupled to the first display or projector 102, the second display or projector 104 and said means 106. The first display or projector 102, in operation, displays first images to be presented to a first eye of a user. The second display or projector 104, in operation, displays second images to be presented to a second eye of the user. The first portion and the second portion are arranged to face the first eye and the second eye, respectively. The first portion and the second portion have a first optical axis and a second optical axis, respectively. Said means 106 for tracking tracks the pose of the first eye and the pose of the second eye relative to the first optical axis and the second optical axis, respectively. The processor 108 or at least one external processor (depicted as an external processor 110) communicably coupled to the processor 108 is configured to:

obtain a given pose of a given eye relative to a given optical axis of a given portion of the display apparatus 100;

generate, based on the given pose of the given eye and a given image to be presented to the given eye, information pertaining to a given visual artifact that is formed over the given image at an image plane when the given image is displayed at a given display or projector;

determine, based on the given pose of the given eye, an artifact-superposing portion of the given image on which the given visual artifact superimposes at the image plane when the given image is displayed at the given display or projector; and process the given image based on the generated information and the determined artifact-superposing portion, to generate a given artifact-compensated image, wherein the processor 108 is configured to display the given artifact-compensated image via the given display or projector.

Figure 2:
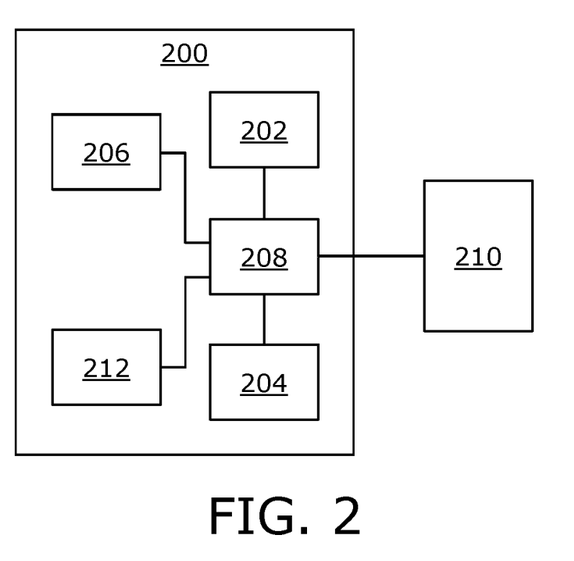

Referring to FIG. 2, illustrated is a block diagram of an architecture of a display apparatus 200, in accordance with another embodiment of the present disclosure. The display apparatus 200 comprises at least one first display or projector (depicted as a first display or projector 202), at least one second display or projector (depicted as a second display or projector 204), a first portion (not shown) and a second portion (not shown), a means 206 for tracking a pose of a first eye and a pose of a second eye, and a processor 208. The processor 208 is communicably coupled to at least one external processor (depicted as an external processor 210). The display apparatus 200 further comprises a means 212 for tracking a gaze direction of the first eye and a gaze direction of the second eye, said means 212 being coupled to the processor 208.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Figure 3:
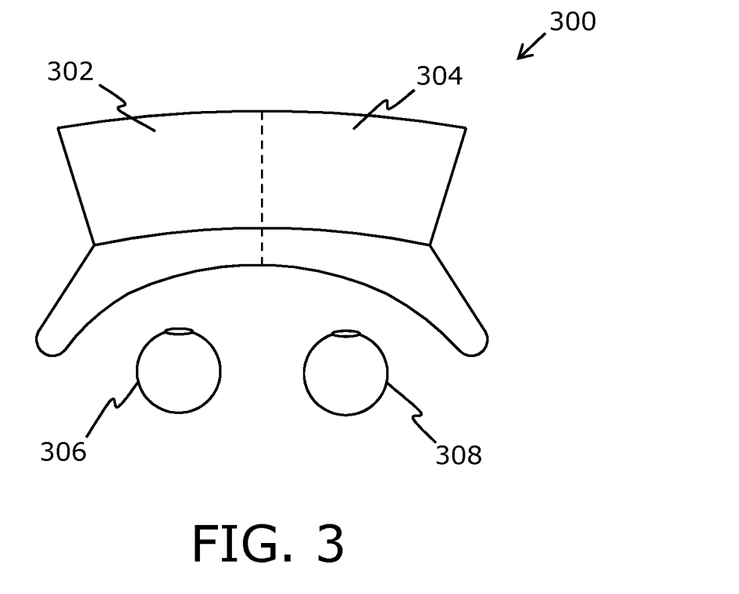
FIG. 3 is a schematic illustration of a top view of a display apparatus, in accordance with an embodiment of the present disclosure.

Referring to FIG. 3, illustrated is a schematic illustration of a top view of a display apparatus 300, in accordance with an embodiment of the present disclosure. The display apparatus 300 comprises a first portion 302 and a second portion 304. As shown, the first portion 302 and the second portion 304, in operation, are arranged to face a first eye 306 of a user and a second eye 308 of the user, respectively.

Figure 4A:
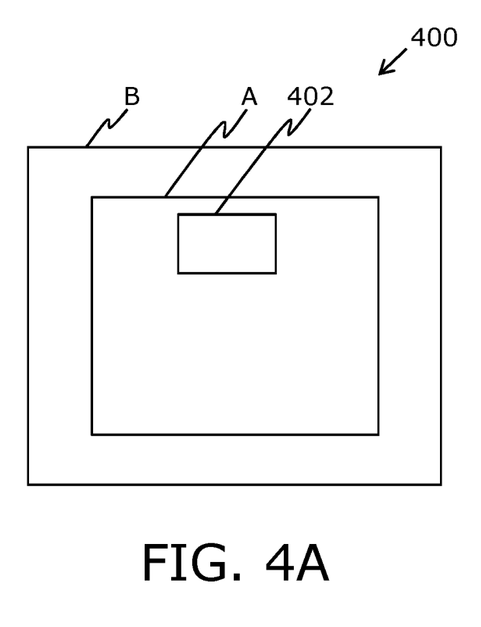
FIGS. 4A and 4B are schematic illustrations of an image plane, in accordance with different embodiments of the present disclosure.
Figure 4B:
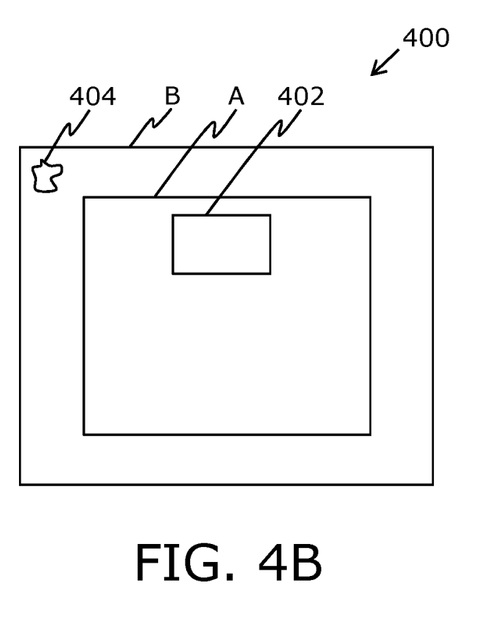

Referring to FIGS. 4A and 4B, illustrated are schematic illustrations of an image plane 400, in accordance with different embodiments of the present disclosure. It may be understood by person skilled in the art that the FIGS. 4A and 4B include schematic illustrations of the image plane 400 for sake of clarity, which should not unduly limit the scope of the claims herein. The person skilled in the art will recognize many variations, alternatives, and modifications of embodiments of the present disclosure.

As shown in FIGS. 4A and 4B, there is shown a given image A that is formed on the image plane 400. There is also shown at least one visual artifact (depicted as a visual artifact 402) that is formed over the given image A at the image plane 400. The visual artifact 402 has, for example, a rectangular shape. An outer boundary B of a viewport lies in a periphery of the given image A.

In FIG. 4B, there is shown at least one other visual artifact 404 that is formed outside the periphery of the given image A at the image plane 400. Specifically, the at least one other visual artifact 404 is formed between the periphery of the given image A and the outer boundary B of the viewport. The at least one other visual artifact 404 has, for example, a freeform shape.

Figure 5:
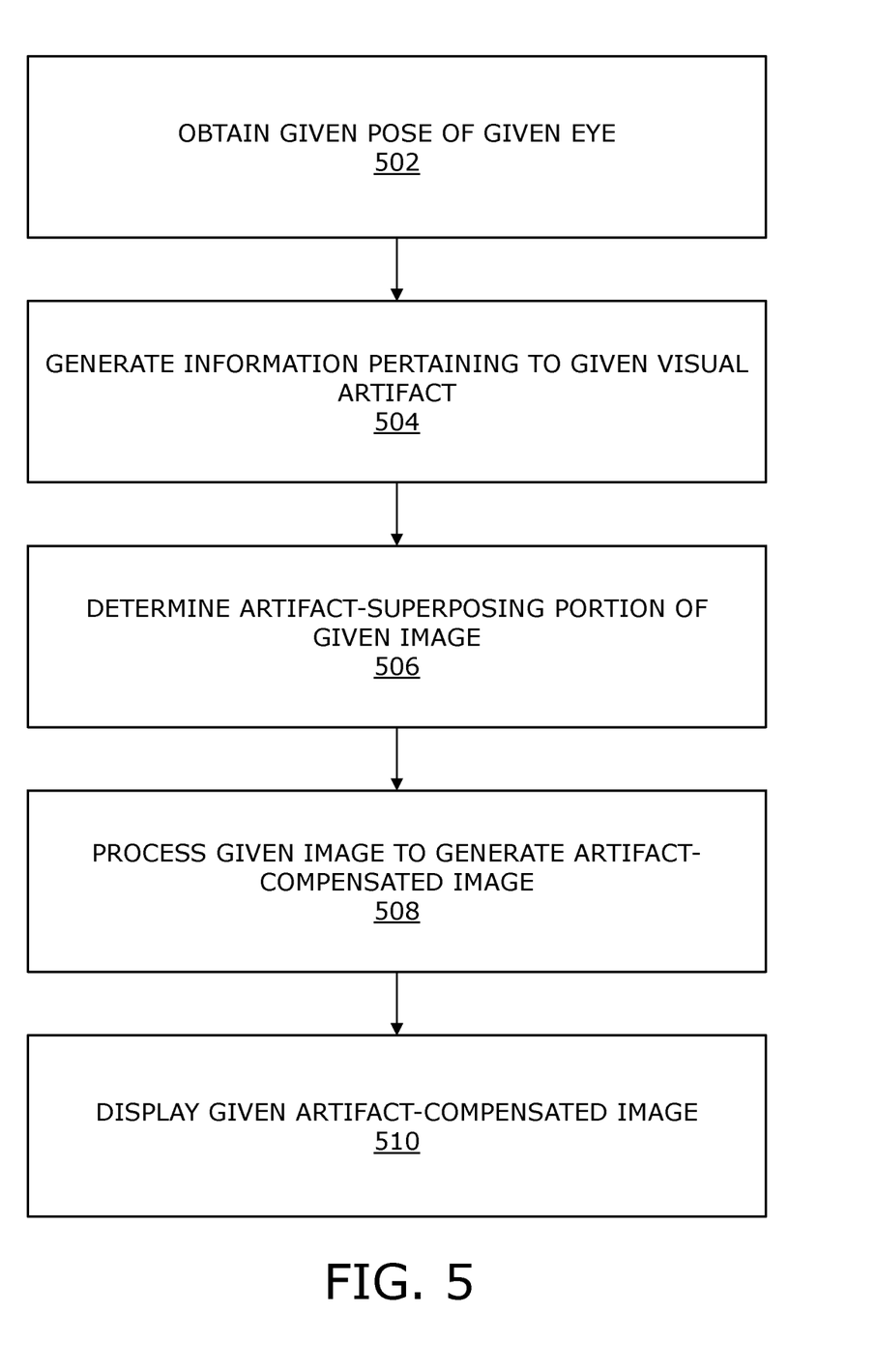
FIG. 5 illustrates steps of a method of compensating for visual artifacts in a display apparatus, in accordance with an embodiment of the present disclosure.

Referring to FIG. 5, illustrated are steps of a method of compensating for visual artifacts in a display apparatus, in accordance with an embodiment of the present disclosure. At step 502, a given pose of a given eye of a user relative to a given optical axis of a given portion of the display apparatus is obtained. At step 504, information pertaining to a given visual artifact that is formed over the given image at an image plane, when the given image is displayed at a given display or projector of the display apparatus, is generated based on the given pose of the given eye. At step 506, an artifact-superposing portion of the given image, on which the given visual artifact superimposes at the image plane when the given image is displayed at the given display or projector, is determined based on the given pose of the given eye. At step 508, the given image is processed based on the generated information and the determined artifact-superposing portion, to generate a given artifact-compensated image. At step 510, the given artifact-compensated image is displayed via the given display or projector.

The steps 502, 504, 506, 508, and 510 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   at least one first display or projector that, in operation, displays first images to be presented to a first eye of a user;
   at least one second display or projector that, in operation, displays second images to be presented to a second eye of the user;
   a first portion and a second portion that are arranged to face the first eye and the second eye, respectively, the first portion and the second portion having a first optical axis and a second optical axis, respectively;
   equipment for tracking a pose of the first eye and a pose of the second eye relative to the first optical axis and the second optical axis, respectively; and
   a processor coupled to the at least one first display or projector, the at least one second display or projector and said equipment, wherein the processor or at least one external processor communicably coupled to the processor is configured to:
      obtain a given pose of a given eye relative to a given optical axis of a given portion of the display apparatus;
      generate, based on the given pose of the given eye and a given image to be presented to the given eye, a reference model for a given visual artifact that is formed over the given image at an image plane when the given image is displayed at a given display or projector, wherein the reference model is based on physical characteristics of the display apparatus;
      determine, based on the given pose of the given eye, an artifact-superposing portion of the given image on which the given visual artifact superimposes at the image plane when the given image is displayed at the given display or projector; and
      process the given image based on the reference model and the determined artifact-superposing portion, to generate a given artifact-compensated image, by adjusting an intensity of pixels within the artifact-superposing portion based on an intensity of pixels within the given visual artifact,
   wherein the processor is configured to display the given artifact-compensated image via the given display or projector,
   wherein the processor or the at least one external processor is configured to obtain a given gaze direction of the given eye and to determine, based on the given gaze direction of the given eye, a region of interest within the given image,
   wherein, when processing the given image, the processor or the at least one external processor is configured to:
      detect whether or not the artifact-superposing portion of the given image overlaps with the region of interest within the given image; and
      adjust the intensity of the pixels within the artifact-superposing portion when it is detected that the artifact-superposing portion of the given image overlaps with the region of interest within the given image.

2. The display apparatus of claim 1, wherein, when obtaining the given pose of the given eye, the processor or the at least one external processor is configured to process eye-tracking data obtained from said equipment to determine the given pose of the given eye relative to the given optical axis of the given portion of the display apparatus.

3. The display apparatus of claim 1, wherein, when obtaining the given pose of the given eye, the processor or the at least one external processor is configured to:
   process eye-tracking data obtained from said equipment to determine a plurality of poses of the given eye relative to the given optical axis of the given portion of the display apparatus; and
   determine the given pose of the given eye by calculating a mean or median of the plurality of poses of the given eye.

4. The display apparatus of claim 1, wherein the information pertaining to the given visual artifact comprises an artifact image that is representative of the given visual artifact.

5. The display apparatus of claim 4, wherein, when generating the information pertaining to the given visual artifact, the processor or the at least one external processor is configured to:
   determine, based on the given pose of the given eye, a deforming transformation to be applied to the given image; and
   apply the deforming transformation to the given image to generate the artifact image.

6. The display apparatus of claim 5, wherein, when generating the information pertaining to the given visual artifact, the processor or the at least one external processor is configured to bin pixels of the given image prior to applying the deforming transformation, wherein a resolution of the artifact image is lower than a resolution of the given image.

7. The display apparatus of claim 5, wherein, when generating the information pertaining to the given visual artifact, the processor or the at least one external processor is configured to determine an artifact-causing portion of the given image that causes formation of the given visual artifact, wherein the deforming transformation is to be applied to the artifact-causing portion of the given image.

8. The display apparatus of claim 1, wherein the processor or the at least one external processor is configured to:
   generate, based on the given pose of the given eye and the given image, information pertaining to at least one other visual artifact that is formed outside a periphery of the given image at the image plane when the given image is displayed at the given display or projector;
   determine at least one other artifact-causing portion of the given image that causes formation of the at least one other visual artifact; and
   adjust, based on the information pertaining to the at least one other visual artifact, an intensity of individual pixels within the at least one other artifact-causing portion of the given image.

9. A method of compensating for visual artifacts in a display apparatus, the method comprising:
   obtaining a given pose of a given eye of a user relative to a given optical axis of a given portion of the display apparatus;
   generating, based on the given pose of the given eye and a given image to be presented to the given eye, a reference model for a given visual artifact that is formed over the given image at an image plane when the given image is displayed at a given display or projector of the display apparatus, wherein the reference model is based on physical characteristics of the display apparatus;

determining, based on the given pose of the given eye, an artifact-superposing portion of the given image on which the given visual artifact superimposes at the image plane when the given image is displayed at the given display or projector;

processing the given image based on the reference model and the determined artifact-superposing portion, to generate a given artifact-compensated image by adjusting an intensity of pixels within the artifact-superposing portion based on an intensity of pixels within the given visual artifact;

displaying the given artifact-compensated image via the given display or projector;

obtaining a given gaze direction of the given eye; and determining, based on the given gaze direction of the given eye, a region of interest within the given image, wherein the step of processing the given image comprises:

detecting whether or not the artifact-superposing portion of the given image overlaps with the region of interest within the given image; and adjusting the intensity of the pixels within the artifact-superposing portion when it is detected that the artifact-superposing portion of the given image overlaps with the region of interest within the given image.

10. The method of claim 9, wherein the step of obtaining the given pose of the given eye comprises processing eye-tracking data to determine the given pose of the given eye relative to the given optical axis of the given portion of the display apparatus.

11. The method of claim 9, wherein the step of obtaining the given pose of the given eye comprises:

processing eye-tracking data to determine a plurality of poses of the given eye relative to the given optical axis of the given portion of the display apparatus; and determining the given pose of the given eye by calculating a mean or median of the plurality of poses of the given eye.

12. The method of claim 9, wherein the information pertaining to the given visual artifact comprises an artifact image that is representative of the given visual artifact.

13. The method of claim 12, wherein the step of generating the information pertaining to the given visual artifact comprises:

determining, based on the given pose of the given eye, a deforming transformation to be applied to the given image; and applying the deforming transformation to the given image to generate the artifact image.

14. The method of claim 13, wherein the step of generating the information pertaining to the given visual artifact comprises binning pixels of the given image prior to applying the deforming transformation, wherein a resolution of the artifact image is lower than a resolution of the given image.

15. The method of claim 13, wherein the step of generating the information pertaining to the given visual artifact comprises:

determining an artifact-causing portion of the given image that causes formation of the given visual artifact; and applying the deforming transformation to the artifact-causing portion of the given image.

16. The method of claim 9, further comprising:

generating, based on the given pose of the given eye and the given image, information pertaining to at least one other visual artifact that is formed outside a periphery of the given image at the image plane when the given image is displayed at the given display or projector;

determining at least one other artifact-causing portion of the given image that causes formation of the at least one other visual artifact; and adjusting, based on the information pertaining to the at least one other visual artifact, an intensity of individual pixels within the at least one other artifact-causing portion of the given image.

* * * * *